UNITED STATES PATENT OFFICE 2,602,031

PROCESS OF PRODUCING PROTEIN PLASTICS FROM FISH PROTEIN

John Ugelstad, Bergen, Norway, assignor to Wm. A. Mohn & Sön A/S, Bergen, Norway No Drawing. Application November 28, 1949, Serial No. 129,873. In Norway January 6, 1949

8 Claims. (Cl. 106—136)

This invention relates to a process of producing protein plastics from water-insoluble animal protein material, such as muscular flesh from fish, wasted fish, fish-wastes, milts, fishmeal, herring-meal and the like.

It has been proposed to produce thermoplastic materials from fish substances, for instance by treating fish-meal, fish flesh and other basic materials with an aldehyde, preferably with formaldehyde under heat and in the presence of water. It is also a well known practice to produce albumin from fish-meal for technical purposes by treating the fish materials with soda lye and by subsequently precipitating the solubilized protein with an acid, whereby the concentration of hydrogen ions in the solution is reduced to 4–6. These processes, which involve the use of a relatively high concentration of lye, as well as high temperatures (60–70° C.), result in an excessive destruction of the protein, thus causing a poor yield and making the precipitate difficult to filter.

It is an object of this invention partly to produce a protein plastic, preferably from fish materials and particularly wastes from the fish industry, and partly to increase the output of protein as compared to the previously known methods, and partly—and also as a result of the increased yield of albumin—to achieve a reduction in the amount of chemicals necessary to obtain a moulding powder. It is a further object of the invention to conduct the decomposition of the proteinaceous raw materials in such manner that they are obtained by precipitation in an easily filterable form, thereby facilitating the further processing into the finished product. A final object of the invention is to produce easily mouldable powders which do not, as is the case with the ordinary procedure in connection with the moulding of casein substances, necessitate a subsequent hardening of the ready moulded press-pieces.

According to the invention this is obtained by first causing water-insoluble protein substances of animal origin to undergo a treatment with alkalies and a subsequent precipitation by means of a mineral acid, the novelty of the invention consisting in the fact that the alkalies are used in quantities corresponding to a limit of 15% based on the dry protein content of the raw material and in the form of soda lye of 0.5–1% concentration at 50–70° C., the solution, prior to its precipitation, being subjected to a hardening process by means of formalin. By this process an increased yield in the precipitation will be obtained in the first place, with a corresponding reduction in the amount of chemicals employed for decomposition and precipitation. Furthermore, the resulting protein will be easily filterable and in an already hardened state. Practical tests have shown that the best results are obtained when the hardening of the solution is carried out with formaldehyde, having a hydrogen ion concentration of 7–10 and in quantities of 2–16% based on the dry protein content of the initial material, in the form of formalin of 40% concentration.

A further improvement in the filtrability of the precipitate may, according to the invention, also be obtained by the fact that the initial materials, prior to their decomposition by means of alkalies, are pretreated with weak acids, as for example acetic acid or sulphurous acid. The acid to be employed may be for example, 0.5% acetic acid in a ratio of from 0.5:1 to 3:1 to the weight of dry protein in the initial material. Such a treatment of the raw material with acetic acid prior to the decomposition by lye—as already stated—will result in an easily filterable precipitate also without the previously mentioned treatment of the protein with formaldehyde, wherefore this treatment may be dispensed with. Furthermore, this treatment will reduce the amount of lye and acid employed for the decomposition and precipitation processes without increasing the duration of the decomposition process. It is thus possible, after this pretreatment, to complete the dissolving of the protein in the course of one hour at a temperature of 40–60° C. by means of an amount of NaCH equal to 5–7%, based on the weight of dry protein in the raw material.

The procedure—which mainly consists in that the protein, with or without any pretreatment of the raw material with weak acids, is dissolved by means of lye, is then hardened with formaldehyde solution and finally precipitated by a mineral acid, for example, sulphuric acid—may be modified in various ways.

Thus the protein can be subjected to a bleaching treatment during and after the dissolving process, but prior to the hardening process. As a bleaching agent hydrogen peroxide, for example, has proved particularly suitable. The bleaching is carried out, for example, by means of 30% $H_2O_2$, the quantity of $H_2O_2$ being 0.9–6% based on the dry weight of protein in the initial material.

In addition to the bleaching and hardening treatments the protein may also be dyed in its dissolved state. Thus it has been proved that, with the use of suitable dye-stuffs, these are completely absorbed by the albumin, so that the albumin may be precipitated in a coloured form. It is likewise possible to effect a co-condensing of the protein with, for example, carbamide resins or dicyandiamide resins and others in the solution. In this case these resins are added in quantities of about 5–15% relatively to the quantity of protein. As precipitating means may be used a mineral acid, as for example sulphuric acid. The precipitation may, as already stated, be undertaken either prior to or after the bleaching process or the hardening process respectively, but it is generally preferred to effect both these operations before the precipitation.

The resulting powder, prior to being moulded, may be treated with alcohol for example, in order to improve the transparency of the finished product. Substances like a-napthol may also be added with the object of increasing water resistance.

The examples below will more specifically illustrate the invention:

Example 1

To 1 kg. fish-meal (protein content about 70%) are added 10 litres of water containing 70 grms. NaOH. The temperature is kept constant during the decomposition at 55–60° C., and stirring is effected by mechanical action throughout the dissolving process. After a certain lapse of time (about three quarters of an hour) the protein is completely decomposed. After filtering off from the bones the pH is reduced to 9, and 40–300 ml. of 40% formalin are added. During the hardening process which takes about one half to one hour, the temperature is kept constant at 40–50° C. Then the protein is precipitated by means of a dilute mineral acid, for example sulphuric acid, the pH being at the same time lowered to 4–5. The aqueous solution is filtered off and the protein dried. Yield about 650 grms. albumin, corresponding to 90% of the protein in the initial material.

Example 2

10–12 litres of water containing 70–100 grms. of NaOH are added to 1 kg. of fish-meal. During and after the dissolving process bleaching is effected with 30–100 ml. of 30% hydrogen peroxide. The further procedure is the same as stated in Example 1.

Example 3

1 kg. of fish-meal is dissolved as stated in Examples 1 and 2. After filtering the pH is reduced to 7. About 100 ml. of 40% formalin are added, as well as a carbamide resin in a quantity of 5–15% of the dry protein in the raw material. The solution is maintained at a temperature of 40–50° C. for ½ to 1 hour, followed by precipitation with sulphuric acid, filtration and drying.

Example 4

1 kg. of fish-meal is treated with 1 litre of 0.5% acetic acid at a temperature of 50–60° C. for ½ to 1 hour, whereupon the water content is increased to 10 litres, and 60–70 grms. of NaOH is added. The temperature during the decomposition is kept at 50–60° C., and the protein will be dissolved in the course of 1 hour. During and after the dissolving process bleaching is effected by means of, for example, 30 ml. of 30% hydrogen peroxide. Upon filtering, precipitation is effected by means of mineral acid and the precipitate is dried. This dried protein may in turn be treated with formalin in the manner known per se, with the object of producing a hardened type of moulding powder.

Prior to its being used for moulding purposes, fillers, such as wood-flour, or plasticising means, for instance monomeric sulphonamides, or the like may be added to the powder.

Having now particularly described and ascertained the nature of my said invention and in what manner the same is to be performed, I declare that what I claim is:

1. A process for the production of a protein plastic from a fish product containing water insoluble protein substances selected from the group consisting of muscular flesh of fish, fish meal, fish wastes, and milts which comprises treating such a fish product with an aqueous 0.5–1% solution of sodium hydroxide at a temperature of 50° C.–70° C. to solubilize protein contained in such material, the quantity of sodium hydroxide solution being such that the quantity of sodium hydroxide contained therein is up to 15% of the dry protein content of such animal protein material, lowering the pH of the resulting solution to 7 to 10, then adding formaldehyde to such solution, and subsequently adding a mineral acid to the solution to precipitate the protein contained therein.

2. A process in accordance with claim 1, in which said fish product is fish meal.

3. A process in accordance with claim 1, in which the formaldehyde is added in a quantity between 2% and 16% of the weight of the dry protein content of the animal protein material.

4. A process in accordance with claim 1, comprising in addition treating said animal protein material with a weak acid in a ratio of 0.5:1 to 3:1 to the dry protein content of the animal protein material prior to the treatment thereof with the aqueous alkali.

5. A process in accordance with claim 1 comprising in addition adding hydrogen peroxide in a quantity between 0.9% to 6% of the dry protein content of the animal protein material to the solubilized protein solution before addition of the formaldehyde.

6. A process in accordance with claim 1 comprising in addition dying the protein in the solution obtained before precipitation with the mineral acid.

7. A process in accordance with claim 1 comprising in addition adding alpha-naphthol to the precipitated protein.

8. A process in accordance with claim 1 comprising in addition treating the precipitated protein with alcohol to increase the transparency of products moulded therefrom.

JOHN UGELSTAD.

REFERENCES CITED

The following references are of record in the file of this patent:

UNITED STATES PATENTS

| Number | Name | Date |
|---|---|---|
| 1,076,417 | Goldsmith | Oct. 21, 1913 |
| 1,302,739 | Weber | May 6, 1919 |
| 2,075,276 | Ellis | Mar. 30, 1937 |
| 2,133,335 | Wilson et al. | Oct. 18, 1938 |
| 2,292,464 | Moss | Aug. 11, 1942 |

FOREIGN PATENTS

| Number | Country | Date |
|---|---|---|
| 19,017 of 1903 | Great Britain | Aug. 18, 1904 |